(12) United States Patent
Cusick, III (10) Patent No.: US 7,274,001 B1
(45) Date of Patent: Sep. 25, 2007

(54) CABLE ASSEMBLY FOR ARC WELDING

(76) Inventor: Joseph Baxter Cusick, III, 1413 N. Estate Rd., Peck, KS (US) 67120

( * ) Notice: Subject to any disclaimer, the term of this patent is extended or adjusted under 35 U.S.C. 154(b) by 0 days.

(21) Appl. No.: 11/123,338

(22) Filed: May 6, 2005

Related U.S. Application Data (60) Provisional application No. 60/657,185, filed on Feb. 28, 2005.

(51) Int. Cl.
*B23K 9/00* (2006.01)
*B23K 9/16* (2006.01)

(52) U.S. Cl. .............................. 219/137.62; 219/137.9

(58) Field of Classification Search .......... 219/137.62, 219/137.63, 137.9; 174/15.6, 15.7, 19, 74 R
See application file for complete search history.

(56) References Cited

U.S. PATENT DOCUMENTS

| | | | |
|---|---|---|---|
| 2,473,258 A | 6/1949 | Potter | |
| 2,527,235 A | 10/1950 | Tuthill | |
| 2,929,912 A | 3/1960 | Lesnewich | |
| 3,018,360 A | 1/1962 | Engel | |
| 3,281,571 A * | 10/1966 | Gilmore | 219/137.9 |
| 3,296,412 A | 1/1967 | Waite et al. | |
| 3,309,492 A | 3/1967 | Fields | |
| 3,803,381 A | 4/1974 | Bernard et al. | |
| 3,944,781 A | 3/1976 | Urbanic et al. | |
| 3,980,860 A | 9/1976 | Howell et al. | |
| 4,284,873 A | 8/1981 | Schluter | |
| 4,297,561 A | 10/1981 | Townsend et al. | |
| 4,393,298 A | 7/1983 | Frantzred, Sr. | |
| 4,864,099 A | 9/1989 | Cusick, III et al. | |
| 5,248,868 A * | 9/1993 | Cusick, III | 219/137.62 |
| 6,005,221 A | 12/1999 | Cusick, III | |
| 6,586,708 B1 | 7/2003 | Cusick, III | |

FOREIGN PATENT DOCUMENTS

JP   1-197074   8/1989

\* cited by examiner

*Primary Examiner*—Kevin P. Kerns
(74) *Attorney, Agent, or Firm*—Robert O. Blinn (57) ABSTRACT

A highly durable cable hose assembly for connecting a welding machine to the conductor tube portion of a pressurized air cooled welding torch includes a cable hose, a rear connector portion for connecting to a welding machine and a front connector portion for connecting to the conductor tube. The cable hose portion includes a gas hose for passage of inert gas, a plurality of cooling air tubes for conducting cooling air, conductive stranding for conveying electrical current for arc welding and a flexible outer hose jacket for enclosing the gas hose, the plurality of cooling air tubes and the conductive stranding in a generally tightly bundled fashion.

21 Claims, 6 Drawing Sheets

CABLE ASSEMBLY FOR ARC WELDING

CROSS REFERENCES TO RELATED APPLICATIONS

This application claims the benefit of U.S. Provisional Patent Application No. 60/657,185 filed Feb. 28, 2005.

FIELD OF THE INVENTION

This invention generally relates to a cable assembly for supplying electric current, inert gas and cooling air to a forced air cooled conductor tube for arc welding.

BACKGROUND OF THE INVENTION

In a typical arc welding system a cable assembly conveys inert gas and a powerful electric current to an arc welding torch. In a typical metal inert gas (MIG) welding system a welding wire feed is also provided through a cable assembly. A cable assembly for an arc welder generally includes a rear connector portion for connecting to an arc welding machine, a cable hose and a front connector portion for connecting to an arc welding conductor tube. In the art, the cable hose assembly and the conductor tube comprise an arc welding torch. An arc welding torch may adapted for manual hand held use or may be adapted for use by a robot. The cable hose of a an arc welding cable hose assembly usually includes a gas hose, conductive stranding and a flexible outer jacket. The gas hose carries inert gas to the arc welding conductor tube for use in shielding the weld location to prevent oxidation of the weld. In the case of a MIG arc welding system, the gas hose also accommodates a flexible conduit which guides an electrode wire that is continuously fed to the working end of the conductor tube during welding operations. The conductive stranding are usually distributed around the gas hose and are typically fashioned from copper strands. The conductive stranding carry arc welding current to the conductor tube. The contents of the cable hose are typically covered by a flexible outer jacket. The rear and front connector portions of a cable hose assembly will each generally include electrically conductive connector blocks for attaching the conductive stranding of the cable hose and fittings for mating with the inert gas hose.

Applicant's U.S. Pat. No. 5,248,868, which is incorporated here as if repeated verbatim hereafter, teaches a forced air cooled welding system including a conductor tube which is supplied by a cable assembly which is adapted for conveying cooling air. The cable assembly taught in U.S. Pat. No. 5,248,868 includes front and rear connector portions and a cable hose having a relatively loose fitting flexible hollow cover through which pass an inert gas hose, conductive stranding and a flow of cooling air. The inert gas hose provides an isolated passageway for inert gas and, in the case of a MIG system, a welding wire liner which guides welding wire. The relatively loose fitting flexible hollow cover enclosing the cable hose assembly taught in U.S. Pat. No. 5,248,868 provides sufficient space for a relatively gentle flow of cooling air. This gentle flow of cooling air transfers heat from the conductive stranding within the hose and is eventually channeled to a jacket surrounding the conductor tube where the cooling air takes up heat from the relatively hot conductor tube.

Since the invention of the forced air cooled arc welding torch described above, the applicant has supplied air cooled cable assemblies for robot welding machines which drive welding torches. Robot welding machines are not subject to the physical limitations of human welders and therefore can move welding torches at very high rates of speed. Such high speed motion increases production rates and so, understandably, the owners and operators of robot welding machines, after taking the precaution of isolating such machines from human workers, are now fully exploiting this high speed capability. Still further, robot welding machines may be programmed to position or rotate the conductor tube of a welding torch in ways that subject a cable hose to relatively large bending and twisting forces greatly exceeding the forces applied by a human welders. Moreover, once programmed, a robot welding machine, unlike a human operator, will execute exact repetitions of these movements. This combination of high speed movements, high stresses and repetitive motion causes the relatively loose fitting flexible hollow cover enclosing forced air cooled cable hose assemblies of the type described in U.S. Pat. No. 5,248,868 to rupture. This causes the interruption of the flow of cooling air. Such rupturing may also occur to a much lesser degree or over much longer periods of use in cable hoses used in manual operations. Accordingly, what is needed is an improved cable hose assembly for supplying a forced air cooled conductor tube which can withstand high speed, high stress operations thus preventing the rupturing of an outer cover or the escape of cooling air.

The advent of powerful high speed robot welding machines has changed another traditional requirement for cable hose assemblies. As is well understood in the welding art, a relatively flexible cable hose assembly is advantageous for manual welding operations. Because of this, flexibility in welding cable hoses has traditionally been understood as a positive attribute. The opposite appears to be true for robot welding operations. When used with a robot welding machine, flexible cable hoses flop excessively during high speed motions while a relatively stiff cable hose is more stable, moves less and is less susceptible to fatigue and failure. The resistance of a relatively stiff cable hose would burden a human welder but is easily overcome by the powerful drive motors of a robot welding machine. Because of this traditional bias toward flexible cable hoses, prior cable hoses for arc welding tend to be too flexible for robot welding operations. Accordingly, since relatively flexible arc welding cable hoses are not universally advantageous, it would be useful to vary the flexibility of arc welding cable hoses so that a relatively stiff cable hose may be fashioned for use by a robot welding machine.

BRIEF DESCRIPTION OF THE INVENTION

The aforementioned need is addressed by an arc welding cable assembly for connecting a conductor tube to an arc welding machine. The cable assembly includes a cable hose portion, a rear connector portion for connecting to a welding machine and a front connector portion for connecting to a conductor tube. The cable hose portion of the cable hose assembly includes a gas hose for passage of inert gas, a plurality of cooling air tubes for conducting cooling air, conductive stranding for conveying electrical current for arc welding and an outer hose jacket for enclosing the gas hose, the plurality of cooling air tubes and the conductive stranding in a generally tightly bundled fashion. In the case of MIG system, the gas hose may also serve as a conduit for a welding wire liner which guides welding wire from the welding machine to the conductor tube. The plurality of cooling air tubes and the conductive stranding are preferably distributed radially about the gas hose in an alternating fashion and are preferably bundled together with the gas tube by the outer hose jacket. The outer hose jacket is preferably fashioned from a relatively thin flexible, elastic material such as rubber tubing.

The resulting cable hose assembly will be relatively stiff in a longitudinal direction if the alternating conductive stranding and cooling air tubes are relatively straight, that is arranged with little or no pitch, relative to the central gas hose. Such a relatively stiff cable hose assembly is well adapted for the high speed, high power operations of a robot welding machine. Moreover, plastic cooling air tubes, aside from carrying cooling air, also act to stiffen a cable hose. Accordingly, replacing one or more cooling air tubes with a comparably sized plastic rod results in an even greater increase in stiffness because solid plastic rods resist bending to an even greater degree than similarly sized tubes. The resulting cable hose assembly will be relatively flexible in a longitudinal direction if the alternating conductive stranding and cooling air tubes are arranged about the central gas hose such that they describe a helix. If the turns of the helix thus described are sufficiently short, the resulting cable hose assembly will be relatively flexible. Such a relatively flexible cable hose assembly is well adapted for manual use by a human welder.

DETAILED DESCRIPTION

Figures 1, 1A:
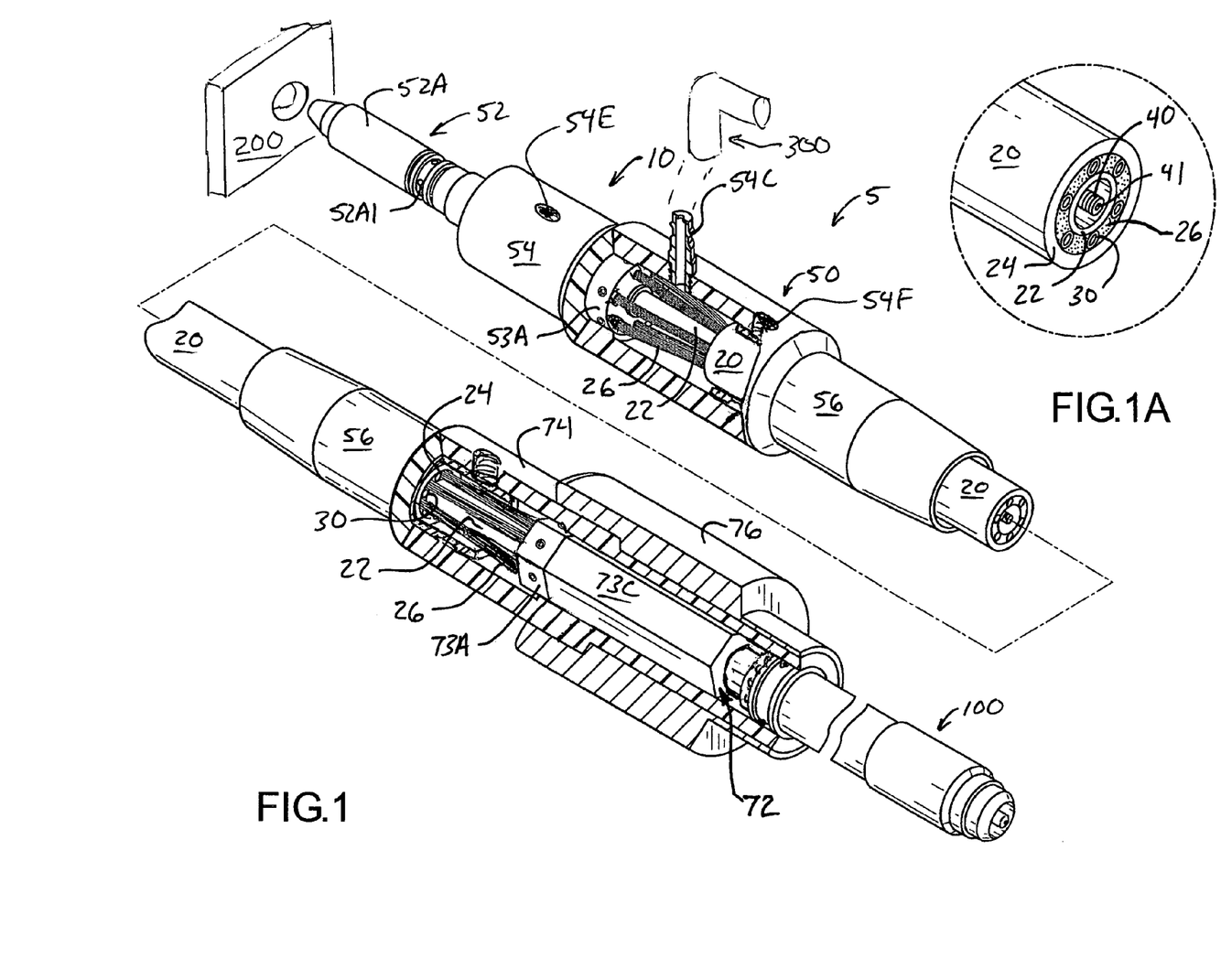
FIG. 1 is a partially sectioned perspective view of an arc welding torch including an arc welding cable assembly and a conductor tube.
FIG. 1A is a magnified view of the front end of the rear connector portion shown in FIG. 1.

Referring to FIG. 1, an arc welding torch 5 is shown including a cable hose assembly 10 which further includes a cable hose 20, rear connector portion 50 for connecting to an arc welding machine (not shown) and a front connector portion 70 (FIGS. 3A and 3B) for connecting to a conductor tube 100.

As can be best seen in FIG. 1A, cable hose 20 includes an inert gas hose 22, an outer jacket 24, conductive stranding 26 and cooling air tubes 30. In the case of a metal inert gas (MIG) welding system, a flexible segmented welding wire conduit 40 runs through gas hose 22. Welding wire conduit 40 provides a protective guide and passageway for welding wire 41. By way of example, welding wire conduit 40 and welding wire 41 would not be needed in a tungsten inert gas (TIG) welding system. Inert gas hose 22 conveys inert gas that is used to shield a weld location to prevent oxidation. Conductive stranding 26 are each preferably fashioned from a multitude of small gauge copper strands sufficient for carrying large amounts of arc welding current without excessive resistance heating. Preferably, conductive stranding 26 are distributed with cooling air tubes 30 about gas hose 22 in an alternating fashion as shown in FIG. 1A. Inert gas hose 22 and cooling air tubes 30 may be fashioned from suitable polymer or plastic materials capable of withstanding moderate temperatures which, under most operating conditions, should not exceed 300° F. Conductive stranding 26 experience some amount of electrical resistance heating. Arranging cooling air tubes 30 as a plurality of relatively small tubes distributed in an alternating fashion with a corresponding plurality of conductive stranding 26 helps to cool conductive stranding 26. The cooling air moving through cooling air tubes 30 is not moving at a high flow rate or at a high pressure. A relatively gentle flow of cooling air through cooling air tubes 30 is sufficient to meet the cooling air requirements of this system. The walls of cooling air tubes 30 are sufficiently conductive of heat to permit heat from conductive stranding 26 to transfer into their respective cooling air streams. It is preferable that inert gas hose 22 and conductive stranding 26 of cable hose 20 be extended from each end of cable hose 20 for connecting to mating structures which will be described in greater detail below. It is preferable that outer jacket 24 be fashioned from a flexible durable material such as rubber. It is also preferable that outer jacket 24 have a diameter and thickness such that it can relatively tightly bundle the contents of cable hose 20. It is also preferably that outer hose jacket be fashioned from radiation cross linked thermoplastic rubber for maximum durability. In this connection, tightly bundled should be understood as not excessively tight so as to significantly stress outer jacket 24, rather tightly bundled should be understood as a condition where conductive stranding 26, which preferably comprise a multitude of small strands, and cooling air tubes 30 are pressed together around inert gas hose 22 such that open space is minimized by a maximum amount of contact between these various elements. If relatively tightly bundled, cable hose 20 will be relatively strong and durable.

Cooling air tubes 30 of cable hose 20 are primarily for conveying cooling air from a cooling air source to the conductor tube of an arc welding torch. As cooling air flows through rear connector portion 50 it picks some heat from the surfaces of various components which are heated by the flow of electric current for arc welding. Cooling air tubes 30 receive slightly heated cooling air from the volume within rear connector portion 50 and convey that cooling air primarily for cooling conductor tube 100 and also, to a lesser extent, provide cooling air for cooling conductive stranding 26 as described above, and front connector portion 70. Conductive stranding 26 and front connector portion 70 experience some electrical resistance heating while conductor tube 100 operates at a relatively high temperature and therefore benefits greatly from forced air cooling. Accordingly, the flow of cooling air through connector portions 50, 70 and air tubes 30 of cable hose 20 provides a beneficial cooling effect. Cooling air leaving front connecting portion 70 is somewhat elevated in temperature because of the heat it has already taken up, but it is still sufficiently low in temperature compared to the hot surfaces of conductor tube 100 that it can transfer highly effective amounts heat from conductor tube 100. A conductor tube provided with a relatively modest and gentle flow of cooling air can maintain a moderated temperature and thus continue operating when overheating would otherwise force a shut down of welding operations.

Figures 5A, 5B, 5C, 5D, 5E, 6A, 6B, 6C:
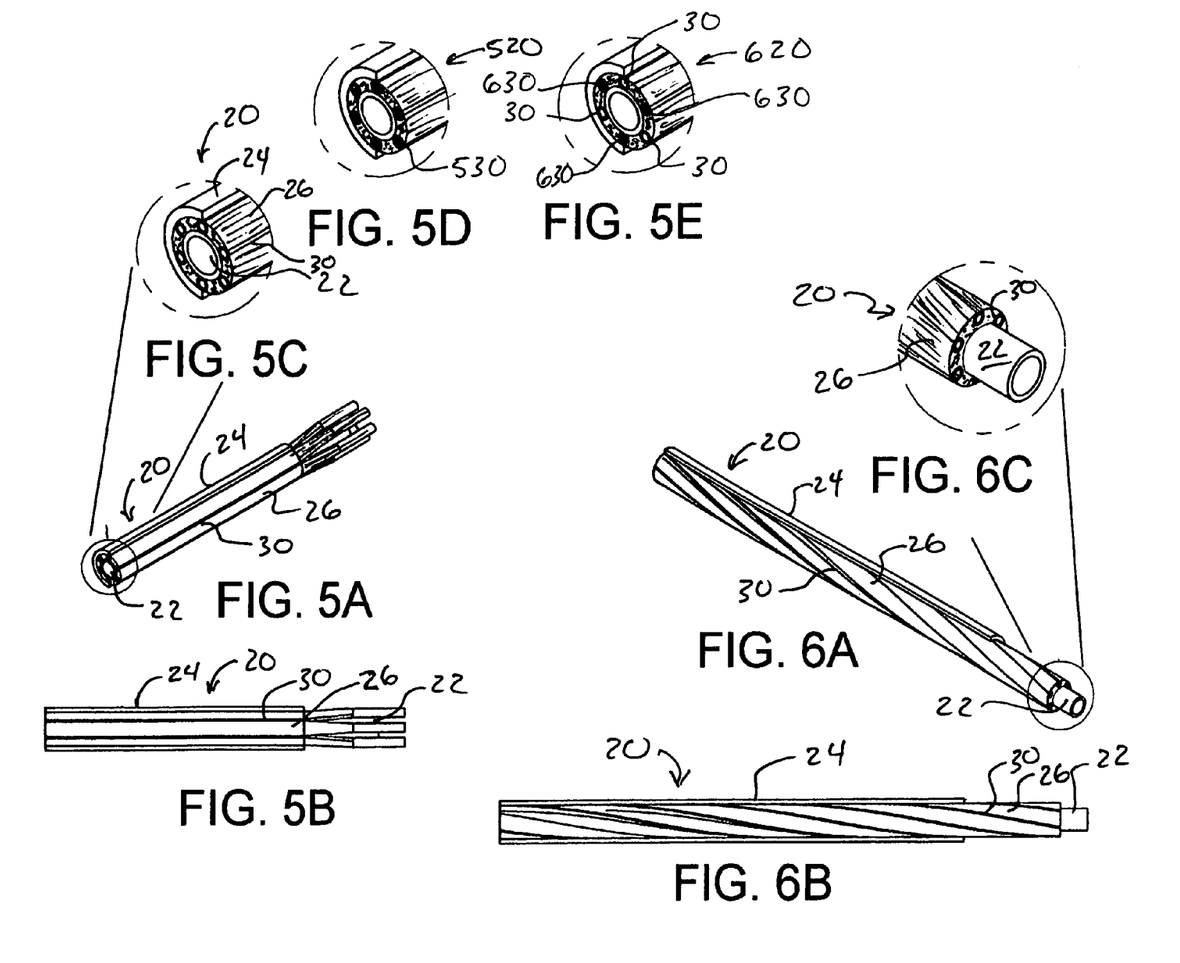
FIG. 5A is a partially cross sectioned perspective view of a cable hose having a straight, no pitch configuration.
FIG. 5B is a side cross section view of a cable hose having a straight, no pitch configuration.
FIG. 5C is a magnified portion indicated in FIG. 5A.
FIG. 5D is a magnified of a cross section of a second embodiment of a non-pitched cable hose having solid plastic rods instead of cooling air tubes.
FIG. 5E is a magnified of a cross section of a third embodiment of a non-pitched cable hose having alternating solid plastic rods and cooling air tubes.
FIG. 6A is a partially cross sectioned perspective view of a cable hose having a helical, pitched configuration.
FIG. 6B is a side cross section view of a cable hose having a helical, pitched configuration.
FIG. 6C is a magnified portion indicated in FIG. 6A.

Cable hose 20 is shown in two embodiments in longitudinal cross section in FIGS. 5A and 6A. In FIG. 6A, cooling air tubes 30 and conductive stranding 26 are arranged around inert gas hose 22 in a spiral shaped, helical or pitched fashion. With the exception of the added cooling air tubes 30, this is a traditional lay up for a cable hose for use in arc welding. The pitched lay up shown in FIG. 6A will yield a relatively flexible cable hose which would generally be more suitable for supplying a hand held or manual welding torch. In FIG. 5A, cooling air tubes 30 and conductive stranding 26 are arranged around inert gas hose 22 in a generally straight fashion. The straight, non-pitched configuration shown in FIGS. 5A and 5D will yield a relatively stiff cable hose. Although such a relatively stiff cable hose might be unsuitable for hand held applications, the applicant has found that a relatively stiff cable hose is highly advantageous for use by powerful, high speed robot welding machines. Accordingly, the arrangement illustrated in FIGS. 5A and 5D would be preferred for a cable hose assembly intended for use by a robot welding machine.

Cooling air tubes 30 also act as stiffeners for stiffening cable hose 20. This is particularly true if cable hose 20 has a strait lay up or non-pitched configuration as shown in FIGS. 5A and 5D. Preferably, cooling air tubes 30 have an inside diameter of approximately 0.090 inches and a wall thickness of approximately 0.0175 inches and are fashioned from nylon-having a modulus of elasticity of approximately $4.7 \times 10^5$ PSI. A pattern of six such tubes as shown in FIG. 5B, if laid up in a straight or non-pitched configuration as shown in FIGS. 5A and 5B will give the resulting cable hose significant additional stiffness.

Figure 7:
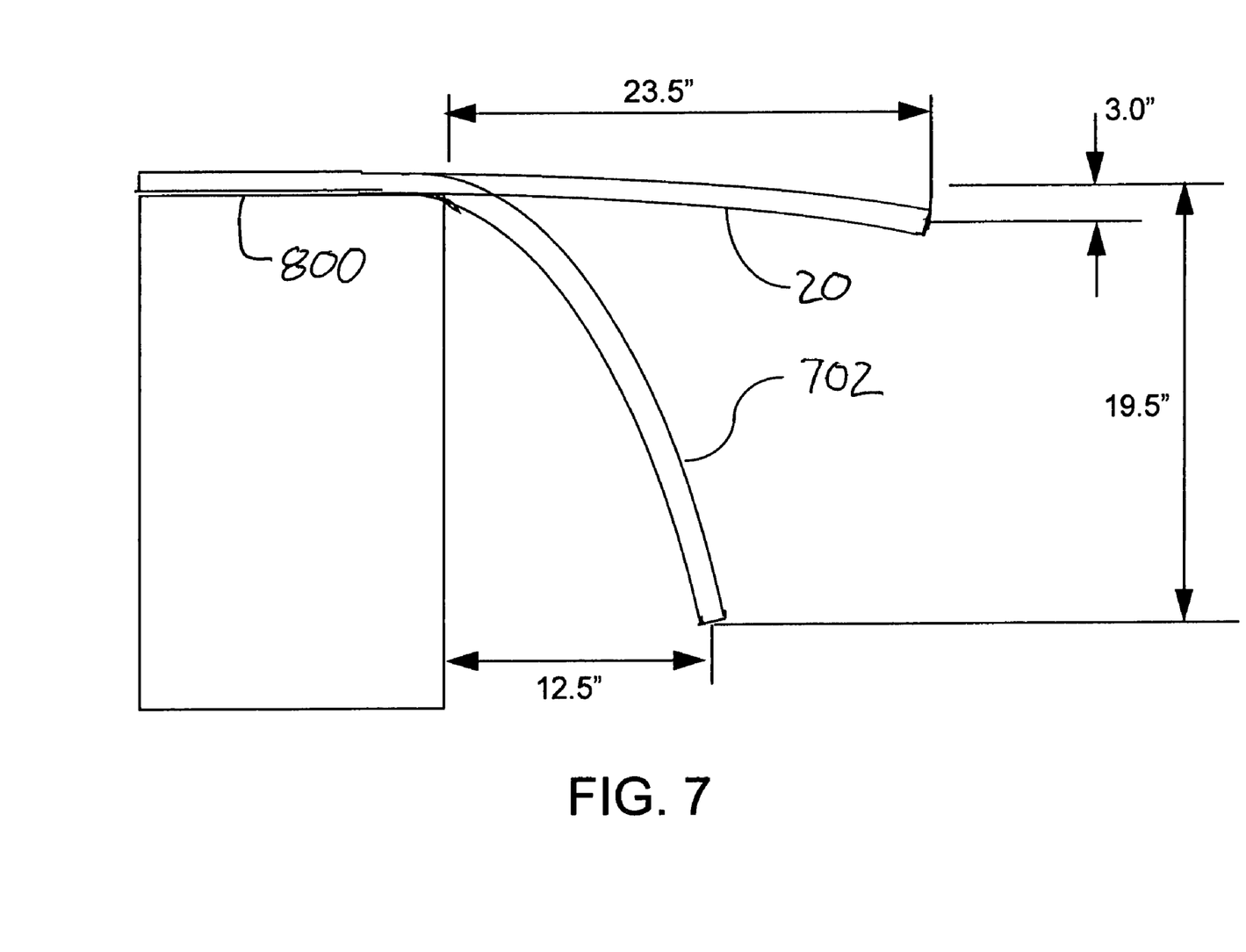
FIG. 7 is a diagram showing the relative stiffness of a non-pitched, straight lay up cable hose of the present invention and a typical prior art co-axial cable hose.

FIG. 7 illustrates the relative stiffness of a typical prior art cable hose 702 and cable hose 20. Cable hose 702 has a pitched configuration similar to that shown in FIGS. 6A and 6B. However unlike, the configuration shown in FIGS. 6A and 6B, cable hose 702 has no cooling air tubes. Cable hose 20 has a pattern of cooling air tubes as shown in FIGS. 5A-5C and is arranged with a straight or non-pitched configuration as shown in FIGS. 5A and 5C. Both cable hoses have an outside diameter of approximately 0.90 inch and include central gas hoses and flexible outer jackets. In both cases, 24 inches of cable are extended past the edge of a flat surface 800. As can be seen in FIG. 7, cable hose 20 droops approximately 3.0 inches while cable hose 702 droops approximately 19.5 inches. FIG. 7 is not presented to provide a precise measurement of stiffness. Rather, FIG. 7 is presented to provide a general demonstration of the increase in stiffness that results when practicing the present invention.

An second embodiment a cable hose, namely cable hose 520, is shown in cross section in FIG. 5D, Cable hose 520 is identical to cable hose 20 with the exception that cooling air tubes 30 have been replaced by solid stiffening rods 530 so that the stiffness of hose 520 is significantly increased. Since cable hose 520 has no cooling air tubes, it would probably not be used to supply a forced air cooled arc welding conductor tube. An third embodiment a cable hose, namely cable hose 620, is shown in cross section in FIG. 5E. Cable hose 620 is identical to cable hose 20 with the exception that every other cooling air tube 30 has been replaced by a solid stiffening rod 630. Cable hose 620 would be stiffer than cable hose 20 and yet would still be able to convey cooling air.

Front and Rear connector portions 70 and 50 are shown in FIGS. 1-3C. Rear connector portion 50 and front connector portion 70 provide connecting structures for linking cable hose 20 to a welding machine the rear end and for linking cable hose 20 to conductor tube 100 at the opposite front end. Since rear connector portion 50 and front connector portion 70 perform similar functions, they have similar structures. Rear connector portion 50 includes electrically conductive elements for connecting between the arc welding current source and the conductive stranding of cable hose 30. Rear connector portion 50 includes a hollow case 54 which mates with a collar 56 which seals with outer jacket 24 of cable hose 20. Case 54 provides passages for the flow of cooling air from a cooling air source to cooling air tubes 30 of cable hose 20. Still further, rear connector portion 50 includes a fitting in communication with an inert gas source for making a gas tight connection with gas hose 22 of cable hose 20. Further details relating to front connector portion 50 will be presented in greater detail below.

At the front end, front connector portion 70 has similar structures for performing functions similar to those performed by rear connector portion 50 described above. Front connector portion 70 includes a hollow case 74 which mates with a collar 56. Collar 56 makes an air tight seal with cable hose 30. Case 74 provides passages for cooling air to flow to the air jacket surrounding forced air cooled conductor tube. Front connector portion 70 also includes electrically conductive elements for establishing electrical communication between conductive stranding 26 and a conductor tube. Still further, front connector portion 70 includes a fitting for making a gas tight connection with gas hose 22 and a passageway for channeling inert gas from gas hose 22 to the inner conductor tube of an arc welding conductor tube. Further details relating to rear connector portion 70 will be presented in greater detail below.

Figure 2A:
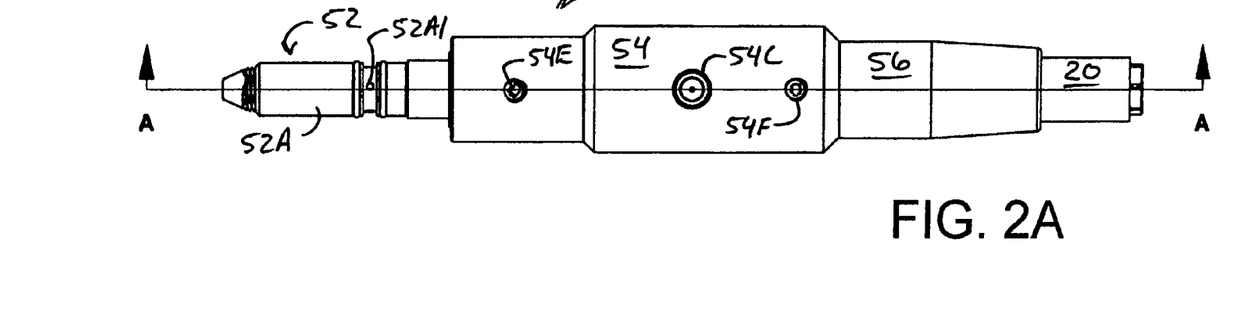
FIG. 2A is a plan view of a rear connector portion of a cable hose assembly.
Figure 2B:
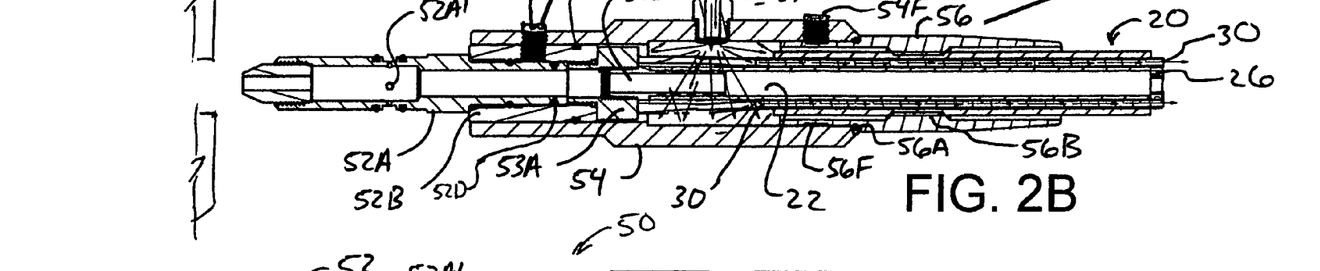
FIG. 2B is a cross section view of a rear connector portion of a cable hose assembly taken from plane A-A of FIG. 2A.
Figure 2C:
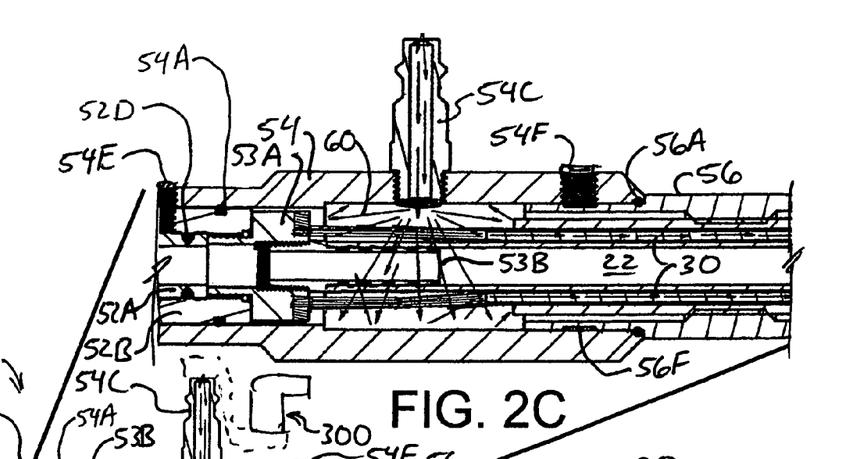
FIG. 2C is a magnified view of a portion of the rear connector portion of FIG. 2B.

Rear connector portion 50 is shown in FIGS. 1 and 1A, and is shown in greater detail in FIGS. 2A-2C. Rear connector portion 50 includes a connector fitting 52, a generally hollow rear case 54 and cable hose collar 56. Connector fitting 52 is adapted to connect to a welding machine 200 diagrammed in FIG. 2B. Generally, welding machine 200 is a source of inert gas and electrical current for welding. In the case of a MIG system, welding machine 200 may also be a source of welding wire. A source of cooling air 300 is also shown in FIG. 2A. Cooling air source 300 is designed to connect with cooling air nipple 54C extending from rear case 54. Connector fitting 52 has an axial passageway for the passage of inert gas and welding wire in the case of a MIG system. Generally, connector fitting 52 includes a plug portion 52A, a collar portion 52B a connector block 53A and an inert gas hose fitting 53B. With the exception of inert gas hose fitting, 53B, plug portion 52A, collar portion 52B and connector block 53A must be electrically conductive and must mate in an electrically conductive manner. Collar portion 52B is designed to threadably receive plug portion 52A at one end and connector block 53A at the other end. Collar portion 52B is received by rear case 54. Rear case 54 and collar portion 52B include corresponding threaded bores for receiving threaded insert 54E. In the case of a metal inert gas (MIG) arc welding machine, connector plug portion 52A receives a feed of welding wire which is fed through welding wire conduit 40 shown in FIG. 1A. Inert gas is received by gas holes 52A1 distributed about connector plug portion 52A and is directed to inert gas hose fitting 53B. Inert gas hose fitting 53B extends forward from connector block 53A and includes a plurality of circumferencial ridges for receiving and making a gas tight engagement with the inside surface of the extended rear end of gas hose 22. Connector block 53A is preferably provided with radially distributed recesses with set screws for receiving and clamping each of the extended conductive stranding 26. Rear case 54 is a generally hollow cylindrical structure fashioned from an electrically insulating material such as nylon. Rear case 54 seals at its rear end against collar portion 52B of connector fitting 52 with an O ring 54A. Collar portion 52B seals against plug portion 52A with an O ring 52D. Rear case 54 seals at its forward with cable hose collar 56 with a second O ring 56A. Cable hose collar 56 is further locked into position by externally threaded insert 54F which is threaded into a corresponding threaded bore in the forward portion of rear case 54. Threaded insert 54F also engages an external groove 56F which is shaped to receive threaded insert 56F. Cable hose collar 56 is shown in greater detail in FIGS. 4A-4D and is described in detail below. Rear case 54 includes a cooling air nipple 54C. Cooling air nipple 54C communicates between a cooling air source 300 shown in FIG. 2B and the interior of rear case 54. As can be seen in FIG. 2B, the open ends of cooling air tubes 30 also communicate with the interior of rear case 54 so that cooling air entering rear case 54 through cooling air nipple 54C is received and conveyed by cooling air tubes 30 through cable hose 20. Arrows 60 in FIGS. 2B and 2C indicate the flow of cooling air from air nipple 54C into cooling air tubes 30.

Figures 4A, 4B, 4D:
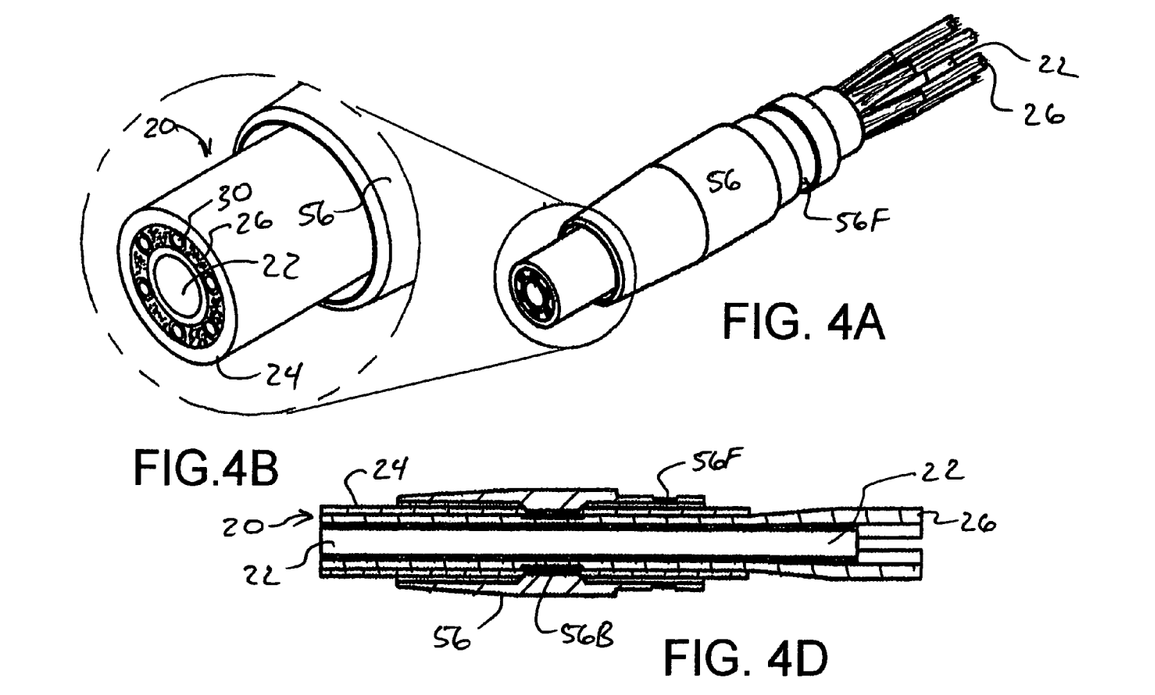
FIG. 4A is a perspective view of a cable hose collar with a cable hose installed.
FIG. 4B is a magnified view of the indicated portion of FIG. 4A.
FIG. 4D is a cross section view of a cable hose collar with a cable hose installed taken from plane A-A of FIG. 4C.
Figure 4C:
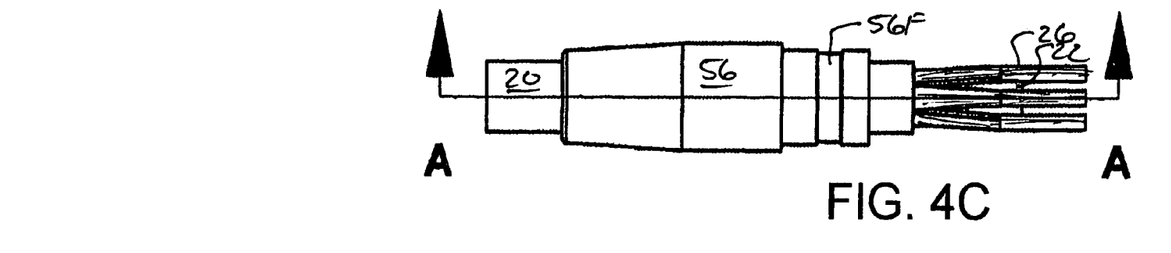
FIG. 4C is a plan view of a cable hose collar with a cable hose installed.

A cable hose collar 56 is used in both front connector portion 70 and rear connector portion 50. At both ends of cable hose 20, a cable hose collar 56 is used to complete an air tight connection between the case of each connector portion (front case 74 or rear case 54) and outer jacket 24 of cable hose 20. Cable hose collar 56 is shown in greater detail in FIGS. 4A-4D. Cable hose collar 56 is preferably fashioned from an electrically insulating material such as nylon. As can be seen in FIG. 4D, the inside wall of cable hose collar 56 includes a seal portion 56B which has an inside diameter sufficiently smaller than cable hose 20 to form an air tight interference fit with outer jacket 24 of cable hose 20. A groove 56F encompasses the outside surface of collar 56 at its mating end for receiving a locking insert as described above. Outer jacket 24 is preferably fashioned from a flexible material such as rubber and should, as described above, bundle the contents of cable hose 20 in a relatively tight fashion. Thus, if seal portion 56B is sufficiently narrow but not too narrow and if it is sufficiently smooth, seal portion 56B will establish an air tight seal with outer hose jacket 24 capable of withstanding moderate air pressure while also permitting cable hose 20 to slide through during assembly without requiring excessive force. The remaining inside wall of cable collar 56 is larger than cable hose 20 to otherwise allow easy passage of cable hose 20 during assembly.

Figure 3A:
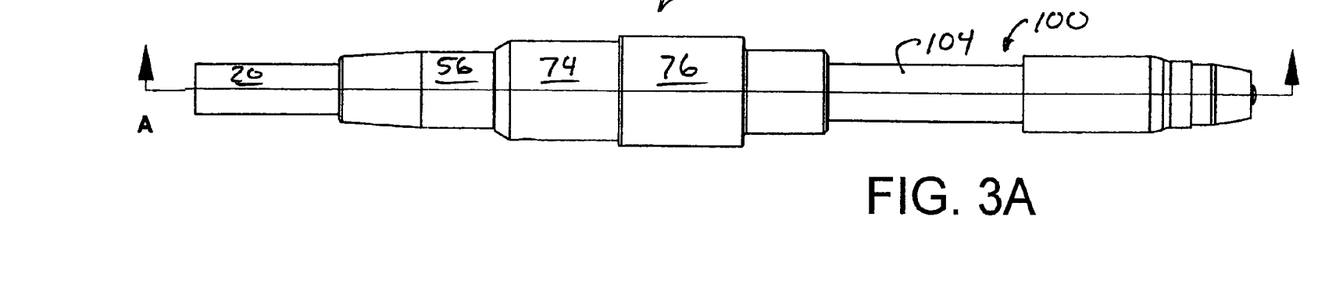
FIG. 3A is a plan view of a front connector portion of a cable hose assembly.
Figure 3B:
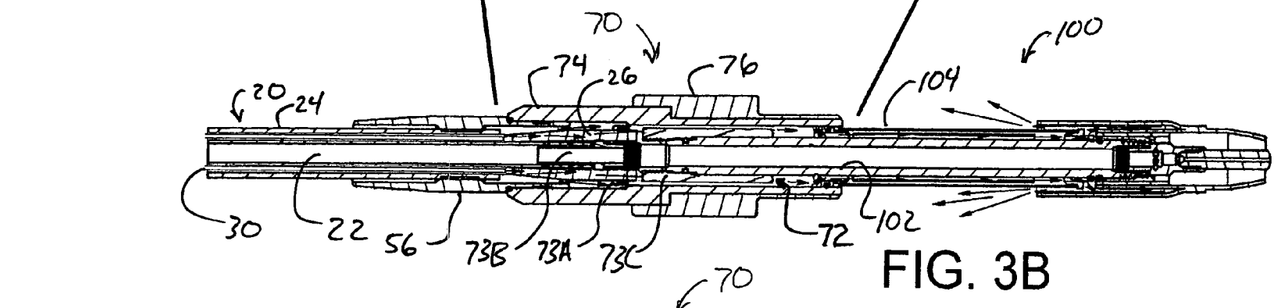
FIG. 3B is a cross section view of a front connector portion of a cable hose assembly taken from plane A-A of FIG. 3A.
Figure 3C:
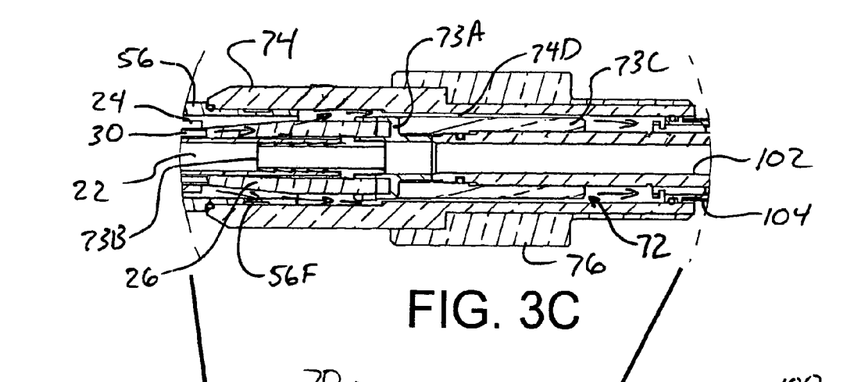
FIG. 3C is a magnified view of a portion of the front connector portion of FIG. 3B.

Front connector portion 70 is also shown in FIG. 1, and is shown in greater detail in FIGS. 3A, 3B and 3C. Front connector portion 70 includes a front case 74, a front connector fitting 72, a robot arm fitting 76 and also includes a cable hose collar 56. Cable hose collar 56 is generally identical to the one described above for use with rear connector portion 50. Front case 74, like rear case 54, is also fashioned from an electrically insulating material. Front connector fitting 72 has an axial passageway for the passage of an inert shielding gas and welding wire (in the case of a MIG system). Front connector fitting 72 includes three components: a connector block portion 73A, an inert gas hose fitting 73B and a forward body portion 73C. Although inert gas hose fitting 73B may be fashioned from any suitable material, connector block portion 73A and forward body portion 73C must be fashioned from an electrically conductive material and must be mated in an electrically conductive manner. Inert gas hose fitting 73B threads into connector block portion 73A and extends rearwardly from connector block 73A and, like inert gas hose fitting 53B described above, includes a plurality of circumferencial ridges for receiving and making a gas tight connection with the extended forward end of gas hose 22. Connector block portion 73A threads into forward body portion 73C and includes provisions for receiving and securing the extended ends of conductive stranding 26 which are substantially identical to those described above for connector block 53A.

Forward body portion 73C includes a central bore which is fashioned to complete a gas tight connection with an inner conductor tube 102 which extends rearwardly from conductor tube 100. As can be seen in FIG. 3C gas hose fitting 73B, connector block portion 73A, forward body portion 73C and inner conductor tube 102 complete a gas tight conduit for communicating inert gas from inert gas hose 22 and, in the case of a MIG welder, also present a passageway for a welding wire conduit which, in turn, guides a feed of welding wire (not shown in FIG. 1). Forward body portion 73C and connector block portion 73A fit closely within the confines of the cylindrical inside wall front case 74. However, forward body portion 73C and connector block portion 73A have polygon shaped cross sections and thus have flat sides which define open spaces 74D with the inside wall of front case 74 for allowing the passage of cooling air. Conductor tube 100 also includes an outer conductor tube 104 which seals with the inside wall of front case 74 at the forward end of front case 74 as shown in FIG. 3C. Inner conductor tube 102 and outer conductor tube 104 thus define an annular passageway for the flow of cooling air toward the front end of conductor tube 100. Thus cooling air exits the open ends of cooling air tubes 30 at the forward end of cable hose 20, enters front case 74, flows around the flat sides of connector block portion 73A and forward body portion 73C and finally into the annular space between inner conductor tube 102 and outer conductor tube 104 of conductor tube 100. Thus, via front connector portion 70, cooling air, electrical welding current, inert gas, and welding wire in the case of a MIG welding system are conveyed from the various transmitting structures of cable hose 20 to the various receiving structures of conductor tube 100.

Cable hose 20 may be tightly bundled and thus arranged as described above to provide a relatively stiff, durable cable hose assembly for serving the conductor tube portion of a forced air cooled arc welding torch and particularly a forced air cooled arc welding torch which is wielded by a powerful, fast moving robot welding machine. The cooling air tubes 30 of cable hose 20 are particularly suited for providing a durable and reliable means for conveying cooling air from a cooling air source to the hot surfaces of a high speed robot driven welding conductor tube. Especially when configured in a straight lay up stiff configuration and applied to a powerful, high speed, robot arc welding system, cable hose assembly 10 can provide a reliable flow of cooling air and thus support long periods of intense operation free of costly down time. Moreover the stiffness and durability of cable hose assembly 10 may be further enhanced with the addition of stiffening rods as described above and as shown in FIG. 5E. Still further, in a non-forced air cooled configuration, the life of a non-air cooled cable hose may be extended with the addition of stiffening rods as shown in FIG. 5D

It is to be understood that while certain forms of this invention have been illustrated and described, it is not limited thereto, except in so far as such limitations are included in the following claims and allowable equivalents thereof.

Having thus described the invention, what is claimed as new and desired to be secured by Letters Patent is:

1. A welding cable hose that conveys cooling air, electric arc welding current and inert gas from a rear connector portion to a front connector portion which is connected to an air jacketed arc welding conductor tube, said cable hose comprising:

a gas hose that receives said inert gas from said rear connector portion and that conveys said inert gas to said front connector portion, conductive stranding that receives arc welding current from said rear connector portion and conveys said electric arc welding current to said front connector portion, at least one cooling air tube that receives cooling air from said rear connector portion and conducts said cooling air to said front connector portion, and a generally flexible outer hose jacket that tightly bundles said conductive stranding, said at least one cooling air tube, and said gas hose.

2. The cable hose of claim 1 wherein, said at least one cooling air tube is a plurality of cooling air tubes and said conductive stranding and said plurality of cooling air tubes are distributed in an alternating fashion around said gas hose generally between said gas hose and said outer jacket.

3. The cable hose of claim 1 wherein, said at least one cooling air tube is a plurality of cooling air tubes and said conductive stranding and said plurality of cooling air tubes are distributed in an alternating fashion around said gas hose generally between said gas hose and said outer jacket, and, said conductive stranding and said cooling air tubes are distributed in a non-pitched, straight laid up fashion to increase the stiffness of the cable hose.

4. The cable hose of claim 1 wherein, said at least one cooling air tube is a plurality of cooling air tubes and said conductive stranding and said plurality of cooling air tubes are distributed in an alternating fashion around said gas hose generally between said gas hose and said outer jacket, and, said conductive stranding and said cooling air tubes are distributed in a pitched, helical fashion to increase the flexibility of the cable hose.

5. The cable hose of claim 1 wherein, said at least one cooling air tube is a plurality of cooling air tubes and said conductive stranding and said plurality of cooling air tubes are distributed in an alternating fashion around said gas hose generally between said gas hose and said outer jacket, and, said cooling air tubes are fashioned from plastic and have an outside diameter of approximately 0.10 inches and an inside diameter of approximately 0.05 inches.

6. The cable hose of claim 1, further comprising:

a welding wire conduit within said gas hose for conveying welding wire to said front connector portion.

7. The cable hose of claim 1, further comprising:

at least one solid plastic rod situated between said gas hose and said outer jacket for increasing the stiffness of said cable hose.

8. A welding cable hose assembly that connects a forced air cooled arc welding conductor tube to sources of inert gas, cooling air and electric current for arc welding, said cable hose assembly comprising:

(a) a cable hose having a rear end and a front end, said cable hose including a gas hose for passage of inert gas, conductive stranding for conveying electric current for arc welding, a plurality of cooling air tubes for conducting said cooling air and a generally flexible outer hose jacket for tightly bundling said conductive stranding and said cooling air tubes and said gas hose, (b) a rear connector portion adapted for connecting said rear end of said cable hose to said sources of electric current for arc welding, cooling air and inert gas, said rear connector portion including electrically conductive elements for connecting between said source of electric current for arc welding and said conductive stranding of said cable hose, a hollow gas tight case including a collar for sealing with said outer hose jacket of said cable hose, and passages for receiving cooling air from said source of cooling air and conveying said cooling air to said cooling air tubes of said cable hose, said rear connector portion also including a fitting in communication with said source of inert gas for making a gas tight connection between said source of inert gas and said gas hose of said cable hose, (c) a front connector portion adapted for connecting said front end of said cable hose to an arc welding conductor tube, said arc welding conductor tube including a conductor tube for conducting arc welding current and for conveying inert gas for shielding a weld to prevent oxidation thereof and a cooling air jacket surrounding said conductor tube for the flow of cooling air, said front connector portion including a hollow gas tight case including a collar for sealing with said cable hose outer jacket and passages for conveying cooling air from said cooling air tubes of said cable hose to said cooling air jacket surrounding said conductor tube, said front connector portion including electrically conductive elements electrically communicating between said conductive stranding of said cable hose and said conductor tube for conducting arc welding current to said conductor tube, said front connector portion also including a fitting for making a gas tight connection with said gas hose of said cable hose, and a passageway communicating with said fitting for conveying inert gas from said gas hose into said conductor tube.

9. The cable hose assembly of claim 8 wherein, said conductive stranding and said cooling air tubes are distributed in an alternating fashion around said gas hose.

10. The cable hose assembly of claim 8 wherein,
said conductive stranding and said cooling air tubes are distributed in an alternating fashion around said gas hose, and,
said conductive stranding and said cooling air tubes are distributed in a non-pitched, straight laid up fashion to increase the stiffness of the cable hose.

11. The cable hose assembly of claim 8 wherein,
said conductive stranding and said cooling air tubes are distributed in an alternating fashion around said gas hose, and,
said conductive stranding and said cooling air tubes are distributed in a pitched, helical fashion to increase the flexibility of the cable hose.

12. The cable hose assembly of claim 8 wherein,
said conductive stranding and said cooling air tubes are distributed in an alternating fashion around said gas hose, and,
said cooling air tubes are fashioned from plastic.

13. The cable hose assembly of claim 8 wherein,
said conductive stranding and said cooling air tubes are distributed in an alternating fashion around said gas hose, and,
said cooling air tubes are fashioned from plastic and have an outside diameter of approximately 0.10 inches and an inside diameter of approximately 0.05 inches.

14. The cable hose assembly of claim 8, further comprising:
a welding wire conduit within said gas hose for conveying welding wire to said conductor tube.

15. The cable hose assembly of claim 8, further comprising:
at least one solid plastic rod situated between said gas hose and said outer jacket for increasing the stiffness of said cable hose of said cable hose assembly.

16. A welding cable hose assembly that connects a forced air cooled arc welding conductor tube having an air jacket for cooling air to sources of inert gas, cooling air and electric current for arc welding, said cable hose assembly comprising:
(a) a cable hose having a rear end and a front end, said cable hose including a gas hose for passage of inert gas, conductive stranding for conveying electrical current for arc welding, a plurality of cooling air tubes for conducting said cooling airs and a flexible outer hose jacket for tightly enclosing said gas hose, said conductive stranding and said cooling air tubes, said cooling air tubes and said conductive stranding disposed around said gas hose in an alternating fashion,
(b) a rear connector portion adapted for connecting said rear end of said cable hose to said sources of electric current for arc welding, cooling air and inert gas, said rear connector portion including a generally hollow case and a cable hose collar for making an air tight seal with said outer jacket of said cable hose and for defining a cooling air channel for the passage of cooling air from said cooling air source to said cooling air tubes, said rear connector portion including an electrically conductive connector block in electrical communication with said source of arc welding current for receiving and securing extended portions of said conductive stranding and said rear connector portion including a fitting in communication with said inert gas source for making a gas tight connection with an extended portion of said inert gas hose,
(c) a front connector portion adapted for connecting said front end of said cable hose to an arc welding torch, said arc welding torch including a conductor tube for conducting arc welding current and for conveying inert gas for shielding a weld to prevent oxidation thereof, and a cooling air jacket surrounding said conductor tube for the flow of cooling air, said front connector portion including a generally hollow case and a cable hose collar for making an air tight seal with said outer jacket of said cable hose portion and for defining a cooling air channel for the passage of cooling air from said cooling air tubes of said cable hose to said air jacket of said conductor tube, said front connector portion including an electrically conductive connector block in electrical communication with said conductor tube of said arc welding torch for receiving and securing extended portions of said conductive stranding of said cable hoses and said front connector portion including a fitting for making a gas tight connection with an extended portion of inert gas hose of said cable hose, said fitting in gas tight communication with said conductor tube of said welding torch, whereby said inert gas is conveyed into said conductor tube, said arc welding current is conveyed to said conductor tube, and said cooling air is conveyed into said air jacket of said conductor tube for beneficial cooling of said conductor tube.

17. The cable hose assembly of claim 16, wherein,
said conductive stranding and said cooling air tubes of said cable assembly are twisted within said outer hose jacket at a pitch angle to define a helix such that the flexibility of said cable hose is increased.

18. The cable hose assembly of claim 16, wherein,
said conductive stranding and said cooling air tubes of said cable assembly are arranged within said outer hose jacket in a generally longitudinally straight, non-pitched fashion such that the stiffness of said cable hose is increased.

19. The cable hose assembly of claim 16, wherein,
said cable hose collar includes a restricted inside surface for completing an air tight seal with said outer cover of said cable hose.

20. The cable hose assembly of claim 16, further comprising:
a welding wire conduit for conveying welding wire to said conductor tube.

21. The cable hose assembly of claim 16, further comprising:
at least one solid plastic rod situated between said gas hose and said outer jacket of said cable hose for increasing the stiffness of said cable hose of said cable hose assembly.

* * * * *